(12) United States Patent
Pernkopf

(10) Patent No.: US 11,016,115 B2
(45) Date of Patent: May 25, 2021

(54) MEASURING DEVICE FOR MEASURING THE SPACE OF TWO SELECTED POINTS ON A SHAPING MACHINE OR HANDLING APPARATUS

(71) Applicant: ENGEL AUSTRIA GmbH, Schwertberg (AT)

(72) Inventor: Friedrich Pernkopf, Gramastetten (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 178 days.

(21) Appl. No.: 16/248,210

(22) Filed: Jan. 15, 2019

(65) Prior Publication Data
US 2019/0219607 A1 Jul. 18, 2019

(30) Foreign Application Priority Data
Jan. 18, 2018 (AT) .................. 50036/2018

(51) Int. Cl.
| | |
|---|---|
| *G01P 15/12* | (2006.01) |
| *B29C 45/76* | (2006.01) |
| *B29C 45/77* | (2006.01) |
| *B29C 45/80* | (2006.01) |

(52) U.S. Cl.
CPC ............ *G01P 15/123* (2013.01); *B29C 45/76* (2013.01); *B29C 45/7653* (2013.01); *B29C 45/77* (2013.01); *B29C 45/80* (2013.01); *B29C 2945/76006* (2013.01); *B29C 2945/76013* (2013.01); *B29C 2945/7619* (2013.01); *B29C 2945/76083* (2013.01);
(Continued)

(58) Field of Classification Search
CPC ..... B29C 45/76; B29C 45/7653; B29C 45/77; B29C 45/80; B29C 2945/76006; B29C 2945/76013; B29C 2945/26083; B29C 2945/7619; B29C 2945/76224; B29C 2945/76317; B29C 2945/76458; G01P 15/123
See application file for complete search history.

(56) References Cited

U.S. PATENT DOCUMENTS

| | | | |
|---|---|---|---|
| 3,251,483 A | 5/1966 | Devol | |
| 3,807,914 A * | 4/1974 | Paulson | .................. B29C 45/77 425/144 |

(Continued)

FOREIGN PATENT DOCUMENTS

| | | |
|---|---|---|
| CH | 679951 | 5/1992 |
| DE | 75 15 422 | 10/1975 |

(Continued)

OTHER PUBLICATIONS

Machine translation of WO 2015/1178441.*
(Continued)

*Primary Examiner* — Natalie Huls
(74) *Attorney, Agent, or Firm* — Wenderoth, Lind & Ponack, L.L.P.

(57) ABSTRACT

A shaping machine or a handling apparatus for a shaping machine includes at least one measuring device for measuring the spacing of two selected points of the shaping machine or the handling apparatus. Furthermore, the at least one measuring device has at least one piezoresistive micromechanical sensor.

18 Claims, 6 Drawing Sheets

(52) U.S. Cl.
CPC ............... *B29C 2945/76224* (2013.01); *B29C 2945/76317* (2013.01); *B29C 2945/76458* (2013.01)

(56) References Cited

U.S. PATENT DOCUMENTS

| | | | | |
|---|---|---|---|---|
| 4,367,655 | A | * | 1/1983 | Bluml ................ B29C 45/7653 73/862.541 |
| 8,092,206 | B2 | | 1/2012 | Brunbauer et al. |
| 2004/0265410 | A1 | * | 12/2004 | Hehl .................. B29C 45/7653 425/169 |
| 2008/0111264 | A1 | | 5/2008 | Esser |
| 2009/0238909 | A1 | * | 9/2009 | Stengel .................. B29C 45/77 425/149 |
| 2010/0255136 | A1 | | 10/2010 | Brunbauer et al. |
| 2012/0231103 | A1 | * | 9/2012 | Catoen ................. G06Q 30/04 425/150 |
| 2018/0299335 | A1 | * | 10/2018 | Wong ................. B81C 1/00547 |
| 2018/0319064 | A1 | * | 11/2018 | Lawless, III ........ B29C 45/7653 |
| 2018/0372564 | A1 | * | 12/2018 | Abbasi Gavarti .... G01L 1/2206 |

FOREIGN PATENT DOCUMENTS

| | | |
|---|---|---|
| DE | 101 51 352 | 5/2003 |
| EP | 0 429 399 | 5/1991 |
| EP | 1 057 586 | 12/2000 |
| EP | 2 131 169 | 12/2009 |
| EP | 2 174 768 | 4/2010 |
| EP | 2 239 125 | 10/2010 |
| WO | 2015/117844 | 8/2015 |
| WO | 2017/028466 | 2/2017 |

OTHER PUBLICATIONS

Scholl, Gerd; Keunecke, Kristoph: Determination of the state of motion of object by analyzing the noise behavior of strapdown MEMS acceleration sensors. 26th Metrological Symposium, AT Aachen. Sep. 2012. DOI: 10.13140/2.1.4140.6084, with English-language Abstract.

* cited by examiner

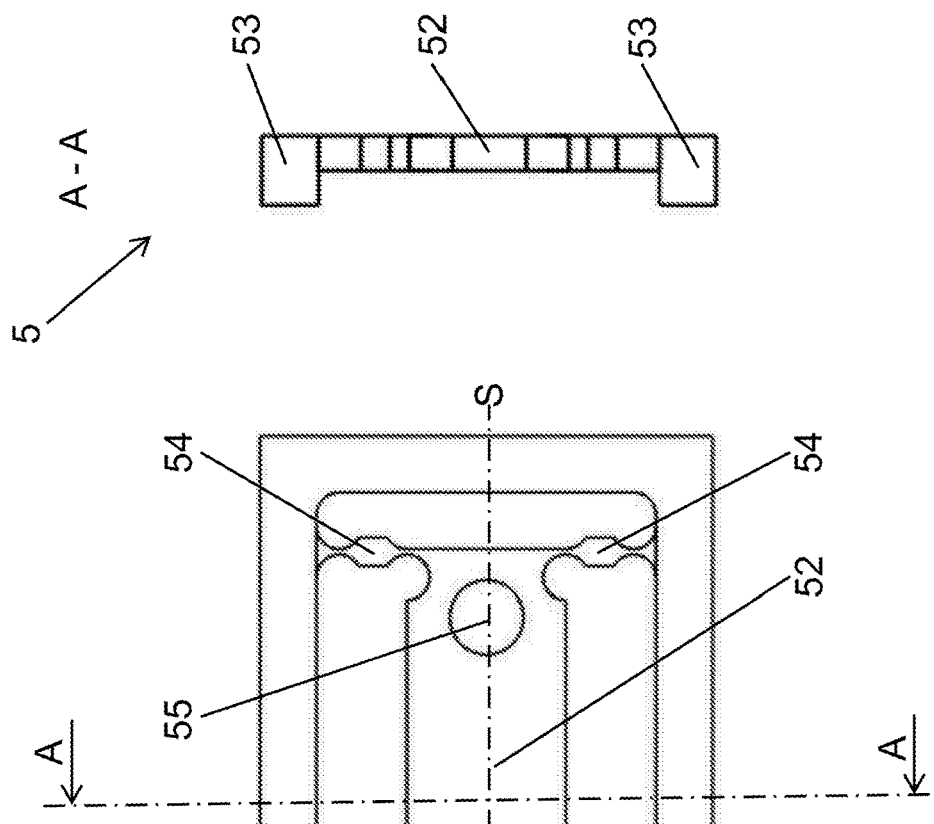
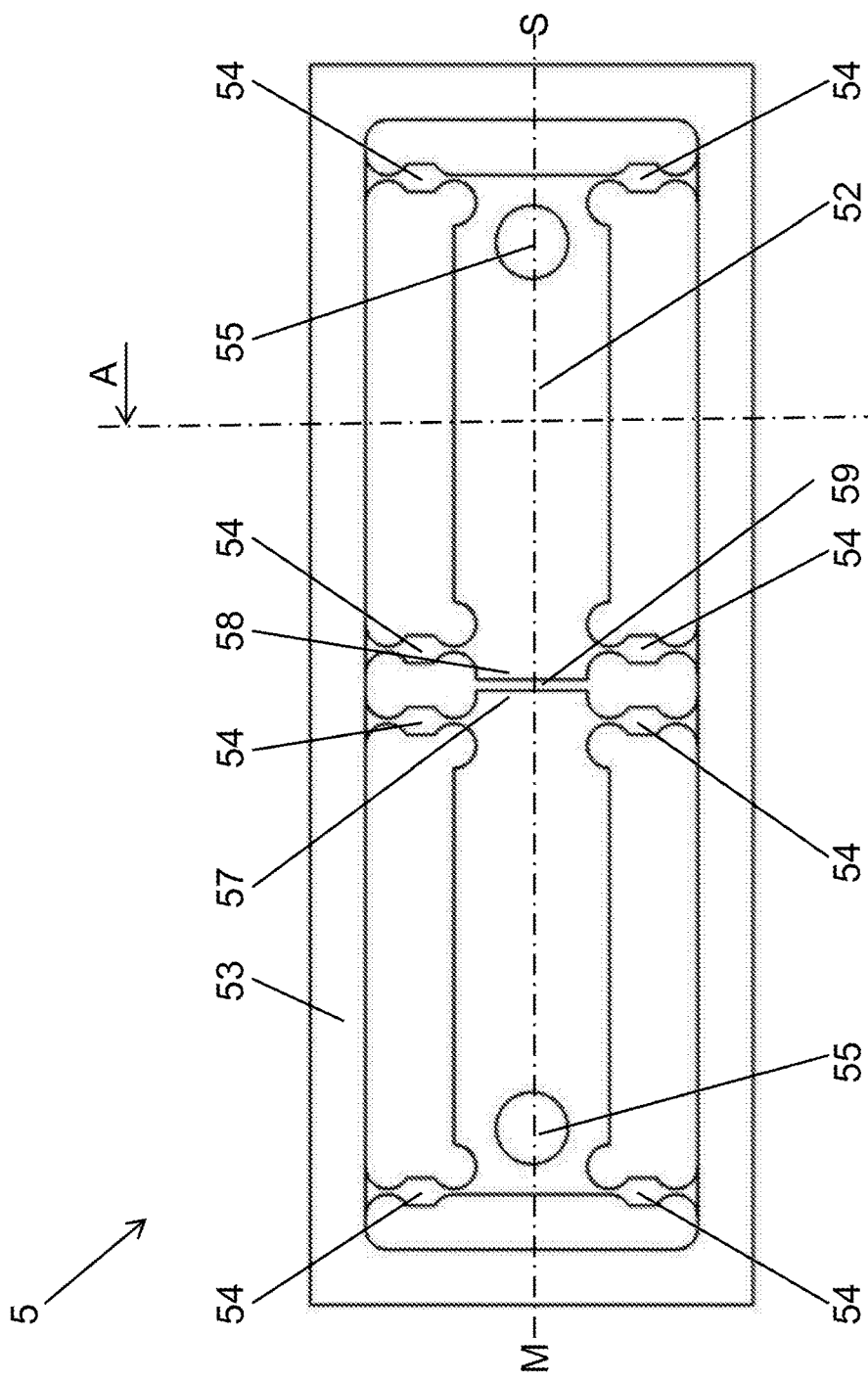

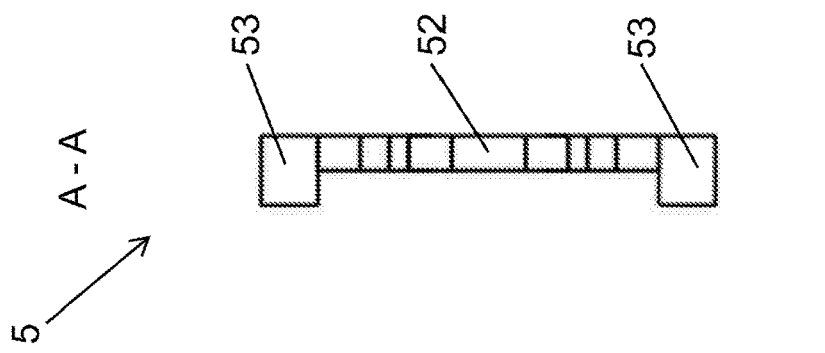
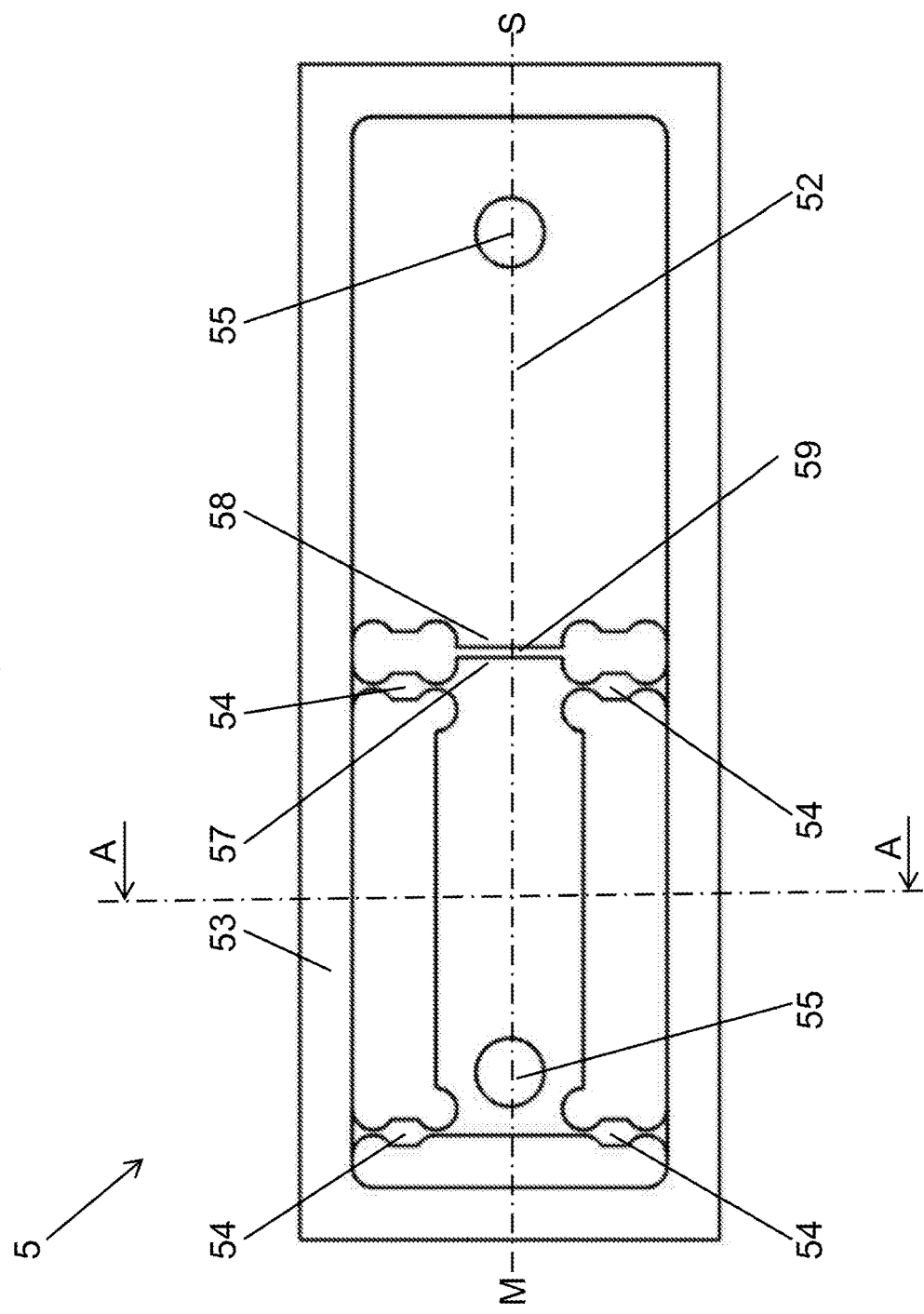

MEASURING DEVICE FOR MEASURING THE SPACE OF TWO SELECTED POINTS ON A SHAPING MACHINE OR HANDLING APPARATUS

BACKGROUND OF THE INVENTION

The present invention concerns a shaping machine or a handling apparatus for a shaping machine.

It is already known for mechanical stresses in a selected component of a shaping machine or the displacement of two selected components to be detected by measuring devices having strain gauges. A corresponding shaping machine is disclosed in EP 2 239 125 B1.

A disadvantage with such shaping machines is the fact that strain gauges are only limitedly suitable for use in mechanically or thermally loaded environments. Over the course of time, thermal drift can occur in the case of strain gauges, and such drift falsifies the measurement results. In addition, the measurement accuracy which can be achieved with strain gauges is scarcely suitable now for modern regulating methods in relation to shaping machines.

A problem which arises is often the excessively large LSB ('least significant bit'): when using strain gauges resolution is often lacking in the case of measurements both in a small and also in a large load range with only one sensor.

SUMMARY OF THE INVENTION

The object of the invention is to provide a shaping machine or a handling apparatus for a shaping machine, in which the above-described problems are avoided.

Piezoresistive micromechanical sensors which can be used according to the invention are sometimes referred to for brevity as MEMS sensors (MEMS—'micro electrical mechanical system'). In comparison with strain gauges, they have a level of sensitivity which is greater by a factor of 100 and can be used in mechanically or thermally stressed environments. No thermal drift occurs, which leads to desirable long-term stability in calibration of the measuring apparatus. The signal delivered by them is distinguished by extremely good linearity.

Piezoresistive micromechanical sensors which can be used according to the invention are known for example from the following state of the art:
WO 2010/139034 A2,
Lateral displacement MEMS Sensor, V Stavroc et al. Proc. Eurosensors XXIV, Sep. 5-8, 2010, Linz, Austria,
Sub nm-Resolution Static Measurement with MEMS Displacement Sensors, Proc. Eurosensors XXIV, Sep. 4-7, 2011, Athens, Greece
Contact Mode MEMS Position Sensors with Piezoresistive Detection, V. Todorov et al, EUROSENSORS 2014, the XXVII edition of the conference series and
Enhancing the Performance of MEMS Piezoresistive Pressure Sensor Using Germanium Nanowire, S Maflin Shaby et al, 2nd International Conference on Nanomaterials and Technologies (CNT 2014).

For measuring a change in length, the piezoresistive micromechanical sensor is to be connected to two selected points, between which there is a spacing to be measured or in respect of which the change in a spacing between them is to be measured. The two selected points, the mutual spacing of which or the change in spacing of which is measured, can be arranged on the same component or on different components.

For further processing, the signals from measurement of the piezoresistive micromechanical sensor can be used directly or it is possible to employ physical parameters derived from those signals.

Mechanical stresses or thermal deformation in components of the shaping machine or the handling apparatus or movements of components of the shaping machine or the handling apparatus can be measured with the measuring device. The expression movements of components of the shaping machine or the handling apparatus can be interpreted as also meaning displacements or shifts of same.

Particularly preferably, the piezoresistive micromechanical sensor is connected to the shaping machine or the handling apparatus by way of a measurement body. The measurement body serves to enhance the accuracy of measurement of the spacing between the selected points by the piezoresistive micromechanical sensor, by a variation in the spacing between the selected points being transmitted to components of the measurement body, that are movable relative to each other along a measurement direction, and by the piezoresistive micromechanical sensor measuring the movement of the movable components of the measurement body. By virtue of a suitable configuration of the measurement body (for example by means of the guide device described hereinafter for the movable components), it is possible to suppress movements in a direction differing from the measurement direction so that the piezoresistive micromechanical sensor only measures movements along the measurement direction. It is, however, also possible to use multi-axis piezoresistive micromechanical sensors. That also permits multi-dimensional measurements.

The measurement body can have the following structure:
There are at least one first component which is stationary relative to one of the selected points, and at least one second component which is movable relative to the first component and which is stationary relative to the other of the selected points. A movement of the at least one first component relative to the at least one second component (along a measurement direction) can be measured by the piezoresistive micromechanical sensor and can be provided (transmitted) by the sensor as a measurement signal. For that purpose, it is connected in a suitable fashion to the first and second components (for example by adhesive).

In order to minimize or entirely exclude influences arising from a direction differing from the measurement direction, it is preferable that the measurement body has a guide device for the at least one first component and/or the at least one second component, which allows at least substantially only movements of the first and/or second component along the measurement direction.

In that case, the guide device is connected to the at least one first component and/or the at least one second component by way of flexural hinges. Preferably, they respectively have two hinge locations which can be for example in the form of two material weakenings or narrowings along the flexural hinge.

The guide device can be in the form of a frame at least partially surrounding the at least one first component and/or the at least one second component. Other configurations are conceivable. For example, the first and/or the second component can be arranged movably along rails.

The measurement body can have a mirror-image symmetrical configuration around an axis of symmetry extending transversely relative to the measurement direction.

The displacement behaviour of the measurement body in respect of different temperatures and the desired compensation of such temperature-induced displacements can be taken into account by the choice of a material having suitable thermal expansion characteristics. Thus, for example, an invar alloy would introduce at maximum a temperature-conditioned displacement of the two selected points into the measurement result, in contrast thereto a more suitable material would minimize and ideally compensate for the temperature-induced displacement component. Therefore, a more suitable material for the measurement body would be the same material as the material which carries the two selected points or a material which has identical or similar thermal properties to the material which carries the two selected points. If the two selected points are provided on different materials, the material for the measurement body is to be one of the two materials which carry the two selected points, or a suitable compromise is to be found in relation to the thermal properties of the materials having the two selected points, for the material of the measurement body. More suitable materials can be determined for example by tests and experiment.

Preferably, the measurement body can have a thermosymmetrical structure.

In addition to the piezoresistive micromechanical sensor, it is possible to provide a temperature sensor. For example, the measured temperature can be used to compensate for the thermally induced displacements of the measurement body. Measurement evaluation and conversion can be effected directly in the at least one measuring device (for example in a microcontroller which is integrated in the measuring device, preferably the measurement body). If there are a plurality of measuring devices equipped with temperature sensors, the measurement data (shifts, temperatures, . . . ) of the various temperature sensors can be implemented in a measurement value converter in one of the measuring devices.

In order to be able to ensure a rigid fixing of the measurement body, which is as spatially stable as possible, at the measurement location at the two selected points of the shaping machine or the handling apparatus it is possible to provide one or more of the following measures:

arranging a friction-increasing device, for example a film, between the measurement location and the measurement body;

using a defined 3-point support: points, knife edges, and so forth, avoiding transmission of bending effects, and avoiding sliding friction effects as they could cause hysteresis.

If the measuring device is secured by adhesive an adhesive should be selected in respect of which no viscoplastic effects arising out of partially elastic adhesives occur.

It is particularly preferable that the piezoresistive micromechanical sensor is secured to the measurement body in biased relationship with an adjustable preloading. That is for the reason that piezoresistive micromechanical sensors in the unloaded state can be scarcely or not at all loaded in compression. By selecting a biasing preloading, the piezoresistive micromechanical sensor can be mounted to the measurement body with a neutral position which is different from the unloaded state, and thus starting from the neutral position in operation can provide measurement signals in and in opposite relationship to the measurement direction.

In regard to the arrangement of the measuring device at or in the shaping machine or the handling apparatus there are many different possible options.

For example, a measuring device can be part of an injection unit, preferably a material barrel, of the shaping machine, and the measuring device is configured to determine an injection force of the injection unit from the measurement signal provided by the piezoresistive micromechanical sensor.

Material barrels are often also referred to as plastizing cylinders, injection cylinders, or the like.

In addition or alternatively, a measuring device can be part of a closing unit of the shaping machine, and the measuring device is configured to determine a closing force of the closing unit from the measurement signal provided by the piezoresistive micromechanical sensor.

Additionally or alternatively, a measuring device can be arranged on a movable arm of the handling apparatus and the measuring device is configured to determine an acceleration of the arm from the measurement signal provided by the piezoresistive micromechanical sensor. Alternatively or additionally, it is also possible to determine a force acting on the handling apparatus by a measuring device arranged at a movable arm of the handling apparatus (for example a force due to the weight of a body arranged on the handling apparatus and preferably to be conveyed, or a contact force of the handling apparatus).

Further possible applications in a shaping machine are for example:

placement of at least one measuring device on the tool for measuring the tool to-and-fro movement, placement of at least one measuring device at a pressing device for a plasticizing cylinder of the shaping machine for measuring a pressing force and/or a hot runner discharge, placement of at least one measuring device at at least one beam member of a closing unit of the shaping machine for measuring beam member stretch and/or closing force distribution, elongation of the barrel in the region of the melt cushion in the radial and/or axial direction for measurement of an instantaneous internal pressure of a plastic material in a plasticizing cylinder of the shaping machine.

Preferably, the shaping machine is in the form of an injection molding machine, preferably a plastic injection molding machine.

BRIEF DESCRIPTION OF THE DRAWINGS

Details of the invention are discussed hereinafter with reference to the Figures, in which:

FIGS. 3a and 3b are a plan view and a sectional view, respectively, of a measurement body without a piezoresistive micromechanical sensor, FIGS. 4a and 4b are a plan view and a sectional view, respectively, of an alternative configuration of a measurement body without piezoresistive micromechanical sensor.

DETAILED DESCRIPTION OF THE INVENTION

Figure 1:
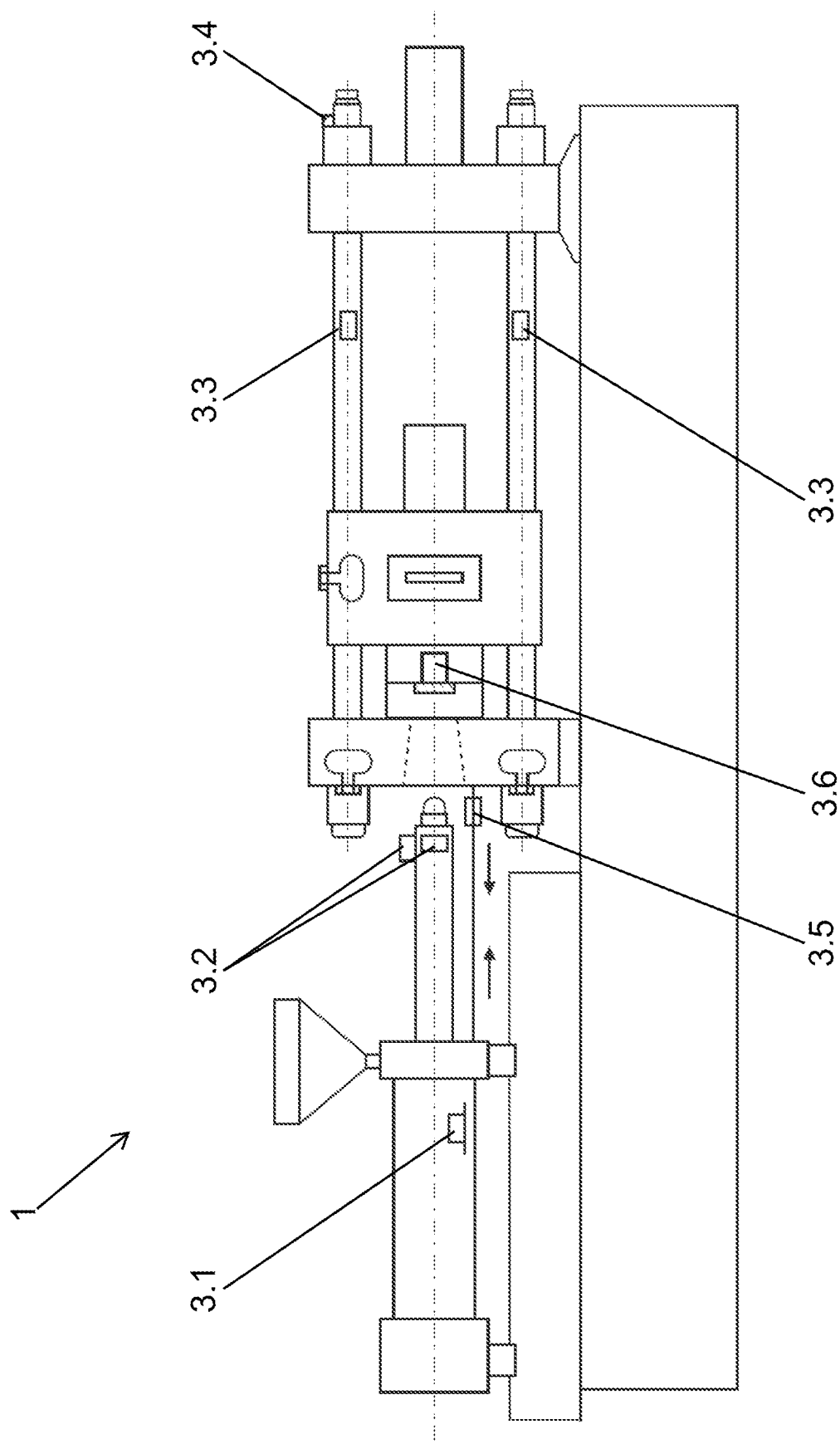
FIG. 1 shows a shaping machine according to the invention.
Figure 2:
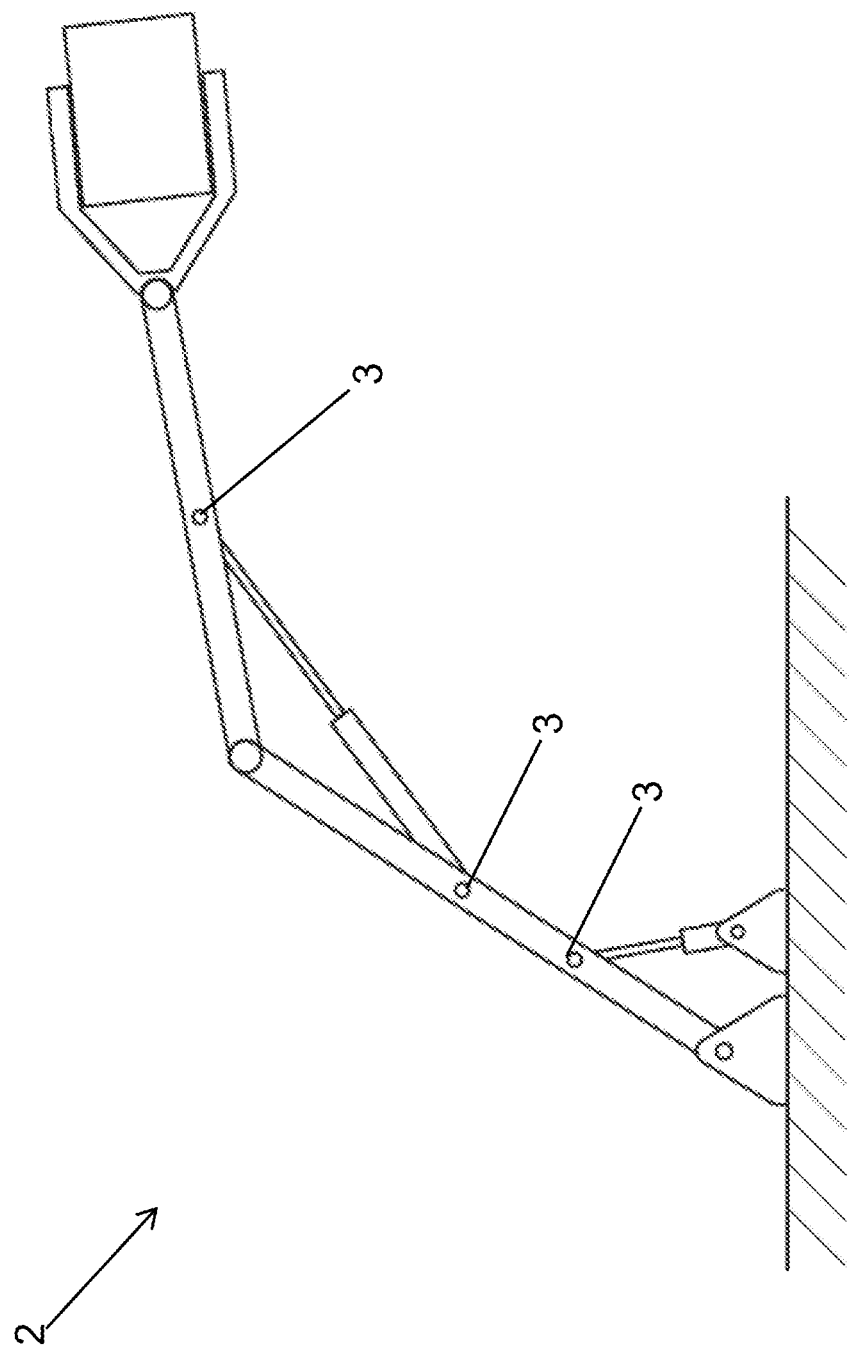
FIG. 2 shows a handling apparatus according to the invention.

FIGS. 1 and 2 show a shaping machine 1 according to the invention and a handling apparatus 2 according to the invention, wherein different possible positions of the measuring device 3 are shown there.

With reference to FIG. 1, the arrangement includes more specifically:
- a measuring device 3 at a first position 3.1 for measuring an injection force,
- measuring devices 3 at second positions 3.2 for measuring an instantaneous internal pressure in a plastic melt in a plasticizing cylinder of the shaping machine,
- measuring devices 3 at third positions 3.3 for measuring a beam member stretch and/or a closing force distribution,
- a measuring device 3 at a fourth position 3.4 for measuring a closing force,
- a measuring device 3 at a fifth position 3.5 for measuring a pressing force and/or a hot runner discharge, and
- a measuring device 3 at a sixth position 3.6 for measuring the tool to-and-fro movement.

FIG. 3a shows a measurement body 5 without piezoresistive micromechanical sensor 4. The measurement body 5 has a mirror-image symmetrical (and thermosymmetrical) configuration around an axis of symmetry S and has a first component 51 and a second component 52 which are guided by a guide device 53 in the form of a frame surrounding the two components 51, 52, along the measurement direction M.

In this example, the first component 51 is arranged by the bore 55 stationarily relative to a selected point A and the second component 52 is arranged by the bore 56 stationarily relative to the other selected point B.

The piezoresistive micromechanical sensor 4 which is still to be fitted in place measures the movement of the two edges 57, 58 (that is to say the size of the gap 59 which is formed by the edges 57, 58 and which here for example is 1 millimeter) and outputs same as a measurement signal.

The guide device 53 is connected to the first component 51 by (in this example) four flexural hinges 54, and to the second component 52 by (in this example) four flexural hinges 54. They have two material weakenings along their extent in a direction in orthogonal relationship with the measurement direction M, thereby respectively providing two hinge locations so that movement of the first and second components 51, 52 in another direction than the measurement direction M is prevented.

FIG. 3b shows a section along line A-A shown in FIG. 3a.

An alternative configuration of the measurement body 5 is shown in FIG. 4a. This does not involve a configuration of mirror-image symmetrical nature. FIG. 4b shows a section along the line B-B shown in FIG. 4a.

Figure 5:
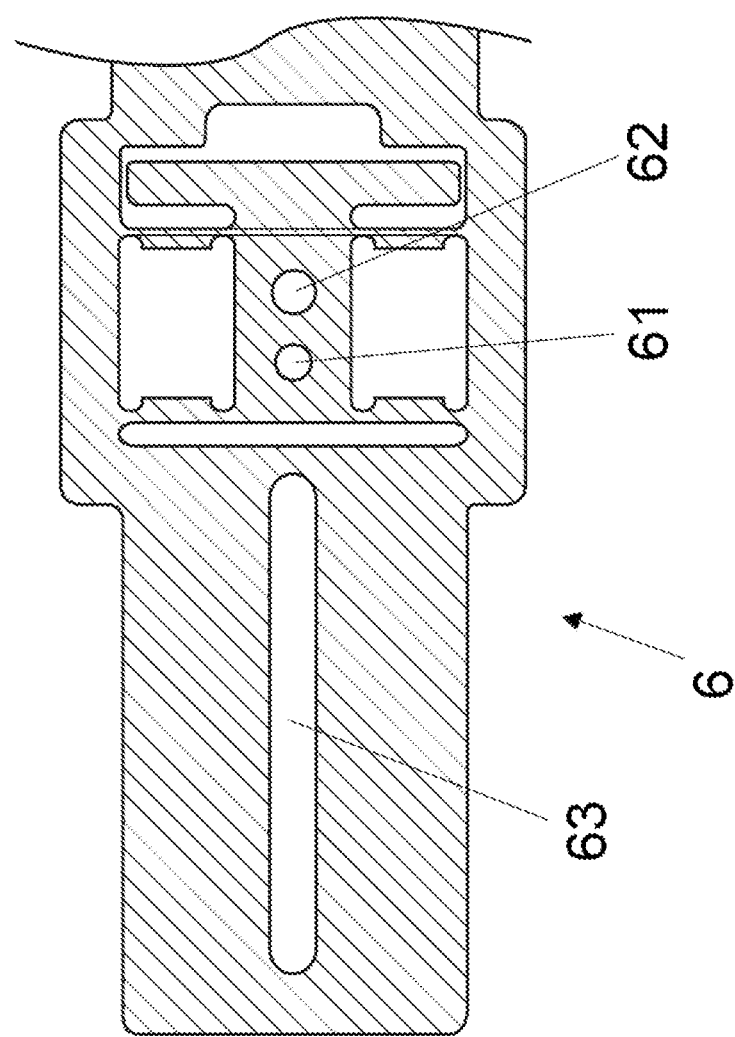
FIG. 5 shows an adjusting device.

FIG. 5 shows a possible configuration of an adjusting device 6 for the piezoresistive micromechanical sensor 4.

This serves to secure the piezoresistive micromechanical sensor 4 to the measurement body 5 in a biased condition with an adjustable biasing preloading. By virtue of the selection of the preloading the piezoresistive micromechanical sensor 4 can be mounted to the measurement body 5 with a neutral position different from the unloaded state, and thus in operation can provide measurement signals in and in opposite relationship to the measurement direction M.

Figure 6:
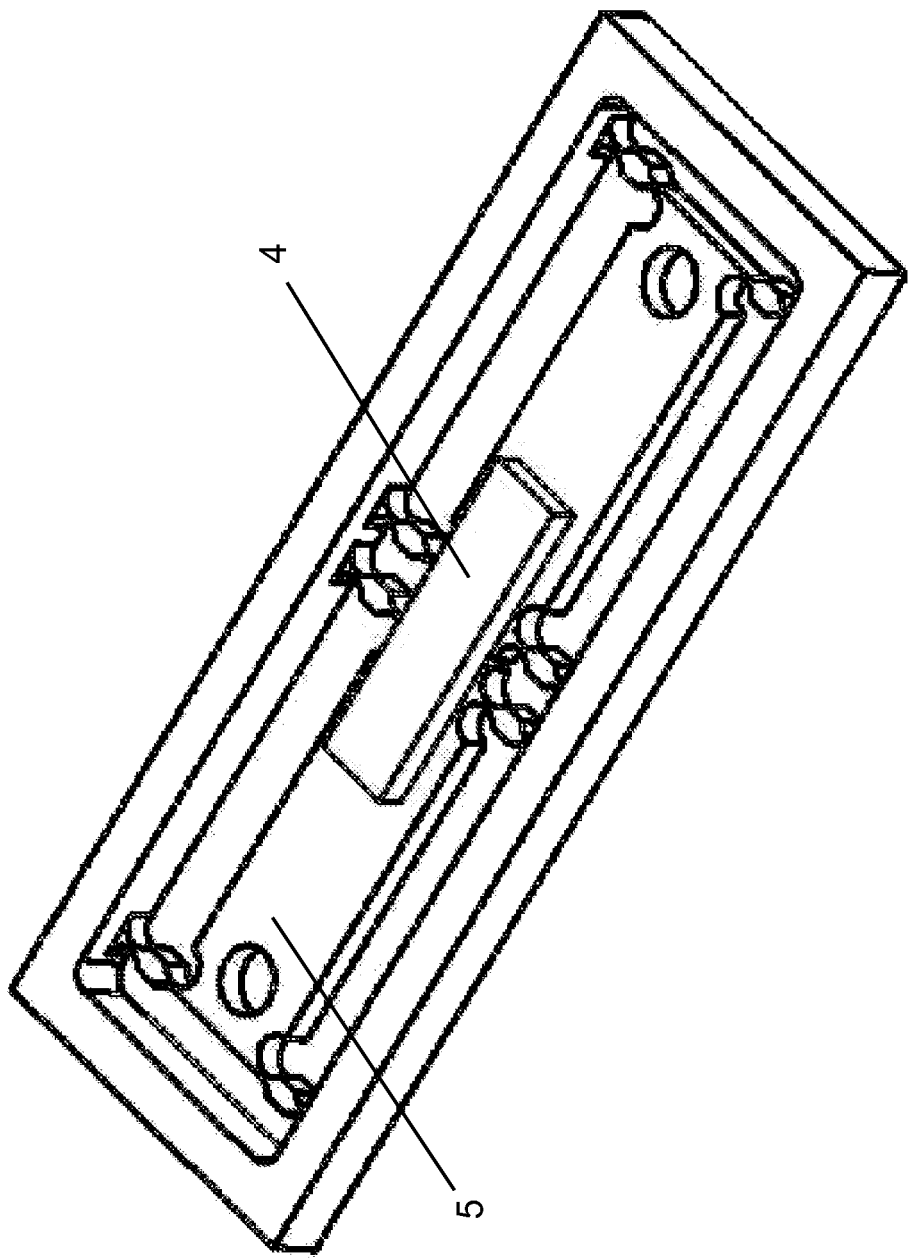
FIG. 6 shows the measurement body shown in FIG. 3 with a piezoresistive micromechanical sensor.

By way of example, the measurement body 5 shown in FIGS. 3a, b can be fixed with its second component 52 by the bore 56 in the bore 61 or 62 (depending on the respective size of the bore 56). Then, the first component 51 can be positioned as desired by way of the bore 55 in the slot 63 and fixed. Depending on the respective positioning of the bore 55 in the slot 63 the size of the gap 59 changes. The piezoresistive micromechanical sensor 4 is then connected in the region of the gap 59 to the first component 51 and the second component 52 (for example using an adhesive connection). Now the measurement body 5 together with the piezoresistive micromechanical 4 can be removed from the adjusting device 6 and is ready for operation (see FIG. 6).

LIST OF REFERENCES 1 shaping machine
2 handling apparatus
3 measuring device
3.1 first position of a measuring device
3.2 second position of a measuring device
3.3 third position of a measuring device
3.4 fourth position of a measuring device
3.5 fifth position of a measuring device
3.6 sixth position of a measuring device
4 piezoresistive micromechanical sensor
5 measurement body
51 first component of the measurement body
52 second component of the measurement body
53 guide device of the measurement body
54 flexural hinge of the measurement body
55 bore in the first component
56 bore in the second component
57 edge of the first component
58 edge of the second component
59 gap between the edge of the first component and the edge of the second component
6 adjusting device for the piezoresistive micromechanical sensor
61 bore
62 bore
63 slot
A, B selected points
M measurement direction
S axis of symmetry

The invention claimed is:

1. A shaping machine or handling apparatus for a shaping machine, comprising;
   a measuring device for measuring the spacing of two selected points of the shaping machine or the handling apparatus, wherein the measuring device has at least one piezoresistive micromechanical sensor;
   wherein the piezoresistive micromechanical sensor is connected to the shaping machine or the handling apparatus by a measurement body,
   wherein the measurement body has a first component stationary relative to a first one of the selected points, and a second component movable relative to the first component and stationary relative to a second one of the selected points, and
   wherein the piezoresistive micromechanical sensor is configured to measure a movement of the first component relative to the second component along a measurement direction, and to transmit the measured movement of the first component relative to the second component along the measurement direction as a measurement signal.

2. The shaping machine or handling apparatus as set forth in claim 1, wherein the measurement body has a guide device for guiding the first component and/or the second component.

3. The shaping machine or handling apparatus as set forth in claim 2, wherein the guide device is connected to the first component and/or the second component by flexural hinges.

4. The shaping machine or handling apparatus as set forth in claim 3, wherein the guide device is a frame at least partially surrounding the first component and/or the second component.

5. The shaping machine or handling apparatus as set forth in claim 1, wherein the measurement body has a mirror-symmetrical configuration around an axis of symmetry extending in orthogonal relationship with the measurement direction.

6. The shaping machine or handling apparatus as set forth in claim 1, further comprising a temperature sensor.

7. The shaping machine or handling apparatus as set forth in claim 6, wherein the temperature sensor is configured to transmit signals therefrom to a microcontroller for the compensation of thermally induced displacements of the measurement body.

8. The shaping machine or handling apparatus as set forth in claim 7, wherein the microcontroller is integrated into the measuring device.

9. The shaping machine or handling apparatus as set forth in claim 8, wherein the microcontroller is integrated into the measurement body.

10. The shaping machine or handling apparatus as set forth in claim 6, wherein the temperature sensor is arranged on the measurement body.

11. The shaping machine or handling apparatus as set forth in claim 1, wherein the piezoresistive micromechanical sensor is secured to the measurement body in a biased relationship with an adjustable biasing.

12. The shaping machine as set forth in claim 1, wherein the measuring device is part of an injection unit of the shaping machine, and the measuring device is configured to determine an injection force of the injection unit from the measurement signal transmitted by the piezoresistive micromechanical sensor.

13. The shaping machine as set forth in claim 1, wherein the measuring device is part of a closing unit of the shaping machine, and the measuring device is configured to determine a closing force of the closing unit from the measurement signal transmitted by the piezoresistive micromechanical sensor.

14. The handling apparatus as set forth in claim 1, wherein the measuring device is arranged on a movable arm of the handling apparatus, and the measuring device is configured to determine an acceleration of the arm from the measurement signal transmitted by the piezoresistive micromechanical sensor.

15. The shaping machine as set forth in claim 1, wherein the shaping machine is an injection molding machine.

16. The shaping machine as set forth in claim 15, wherein the shaping machine is a plastic injection molding machine.

17. The shaping machine as set forth in claim 1, wherein the piezoresistive micromechanical sensor is configured to measure a displacement of the first component relative to the second component along the measurement direction.

18. The shaping machine as set forth in claim 1, wherein the measuring device is part of a material barrel of the shaping machine, and the measuring device is configured to determine an injection force of the injection unit from the measurement signal transmitted by the piezoresistive micromechanical sensor.

* * * * *